(12) United States Patent
Besler et al.

(10) Patent No.: US 6,244,752 B1
(45) Date of Patent: Jun. 12, 2001

(54) SINGLE-PIECE OPTICAL FIBRE COUPLING

(75) Inventors: Martin Besler, Nuremberg; Guntram May, Altdorf; Jurgen Meyer, Nuremberg, all of (DE)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/318,386

(22) Filed: May 25, 1999

(30) Foreign Application Priority Data

May 26, 1998 (DE) .............................................. 198 23 518

(51) Int. Cl.[7] ....................................................... G02B 6/38
(52) U.S. Cl. ................... 385/70; 385/69; 385/87; 385/62
(58) Field of Search .................................. 385/70, 71, 72, 385/86, 87, 62, 69

(56) References Cited

U.S. PATENT DOCUMENTS 5,115,484 * 5/1992 Johnson ................................. 385/72
5,832,158 * 11/1998 Chen ..................................... 385/53

* cited by examiner

Primary Examiner—Hung N. Ngo
(74) Attorney, Agent, or Firm—Perman & Green, LLP

(57) ABSTRACT

A single-piece optical fiber coupling (1) is specified which has a housing (2) with at least two holder openings (3a, 3b), which are arranged coaxially and run towards each other, for the optical fiber ends (4a, 4b) to be connected, the holder openings (3a, 3b) each having an outer section (3c, 3d) with a threaded crimp (3g) and an inner section (3e, 3f) with a thread (3h) of lower depth.

14 Claims, 4 Drawing Sheets

SINGLE-PIECE OPTICAL FIBRE COUPLING

The present invention relates to a single-piece optical fibre coupling for the non-detachable, tight connection of fibre-optic cables.

Such couplings are used to lengthen permanently laid fibre-optic cables or, if such cables have been damaged, are used to repair fibre-optic cable lines in a cable harness.

An optical fibre plug is already known, in which one cable end is "stripped", that is to say the sheath is removed and the plug is pushed over the optical fibres and over the front end of the cable sheath. The plug is then crimped to the cable sheath, in order to connect it to the cable so that it cannot tear off. The plug is plugged, by way of one plug-in end, into a corresponding sleeve, and to this extent does not solve problems which can occur in the region of the end of the fibre.

The present invention is based on the object of presenting an optical fibre coupling which connects two optical fibre ends to each other in a non-detachable manner and so that they are tightly sealed with respect to dust as well as liquid and gaseous media.

This object is achieved in accordance with the claims.

Preferred embodiments of the present invention are characterized in the subclaims.

The basic idea of the present invention is to plug the cable ends to be connected into holders of a coupling which abut coaxially at their ends, the holder centring the cable ends and thus aligning them optimally with respect to each other, the cable ends being prevented from tearing off by crimping the coupling to the cable sheaths.

In the following text, the invention will be explained in more detail using the description of an exemplary embodiment and with reference to the drawing, in which.

Figure 1:
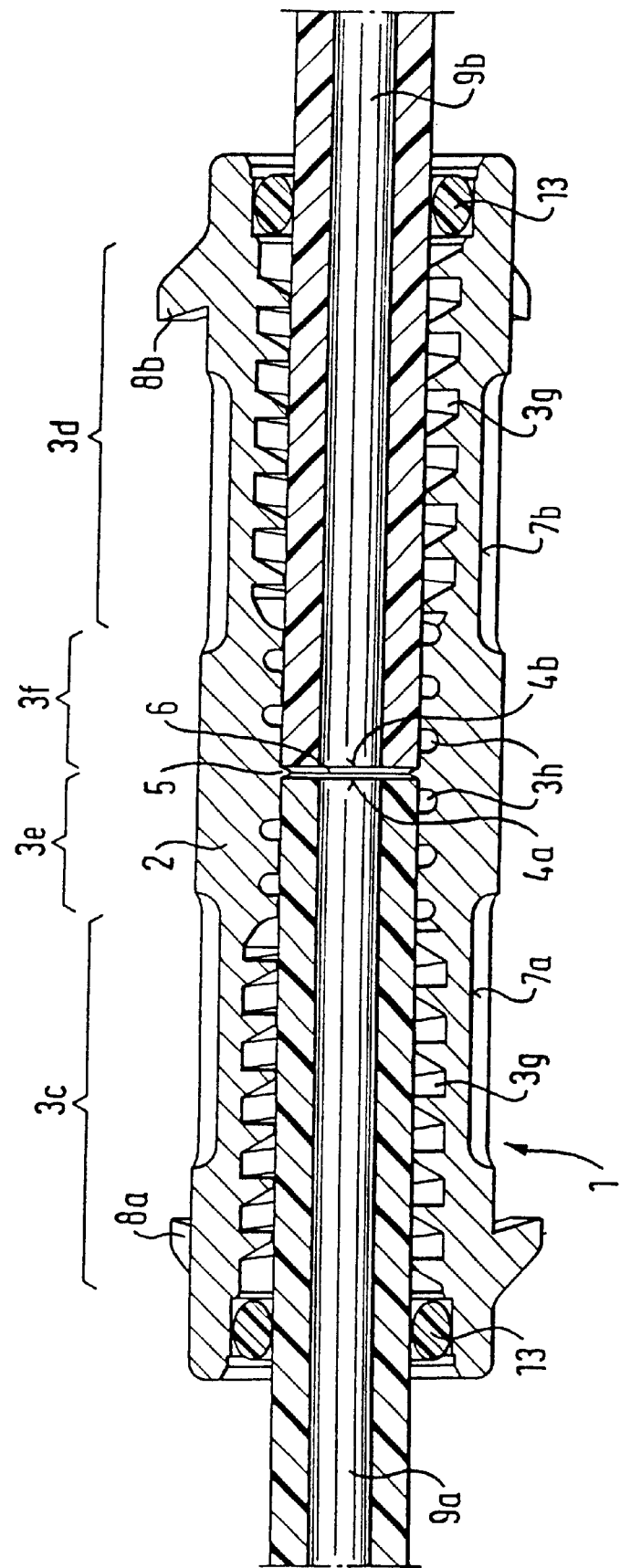
FIG. 1 shows a longitudinal section of the single-piece optical fibre coupling according to the invention.

FIG. 1 shows the coupling 1 as a section through the housing 2, in which there are two cable ends 9a, 9b, the ends of which have been brought together coaxially. Between the cable ends there is a small gap 6, which is brought about by the stop 5, which, as an annular rib for each of the two holders 3a, 3b of the housing 2, constitutes a stop for the respective plastic fibre cable end (POF Polymer Optical Fibre) to be inserted. The holders 3a, 3b have internal threads, which are in each case constructed in an outer region 3c, 3d as a crimp thread, that is to say have a large thread depth, in order that the material of the cable sheath which is deformed during crimping has space to escape away from the plastic fibre, in order not to subject the latter unduly to any damaging pressure. In the inner region 3e, 3f of the holders 3a, 3b there are likewise threads, but their thread depth is significantly smaller and fulfils a different purpose. On the one hand, the lower thread depth has the effect that more guide surfaces "remain in place" on the inner walls of the holders for the plastic fibre cables 9a, 9b, so that at the point where the cable ends are also centred by the slightly conical taper towards the stop 5, a relatively large bearing surface or guide surface will be found. The threads in the inner region of the holders 3a, 3b are, in addition, preferably round threads and, as can be seen in FIG. 3, open in the interspace 6 between the plastic fibre ends. This has the effect that, when the plastic fibre ends are inserted into the holders, excess optical gel, which may be provided there, is expelled out of the interspace 6 through the thread turns 3h. An optimum fit is thus ensured, even when there is an excess of optical gel. In addition FIG. 1 shows the crimp beads 7a, 7b, which are produced by crimping tools, after the latter have pressed the thread 3g into the cable sheath. The coupling is sealed off at both ends by sealing rings 13, which are in each case mounted at the inlet to the holders.

It is furthermore possible to see in FIG. 1 latching tabs 8a, 8b, which are used to hold anti-kink sleeves, which are slipped over the coupling, by latching.

Figure 2:
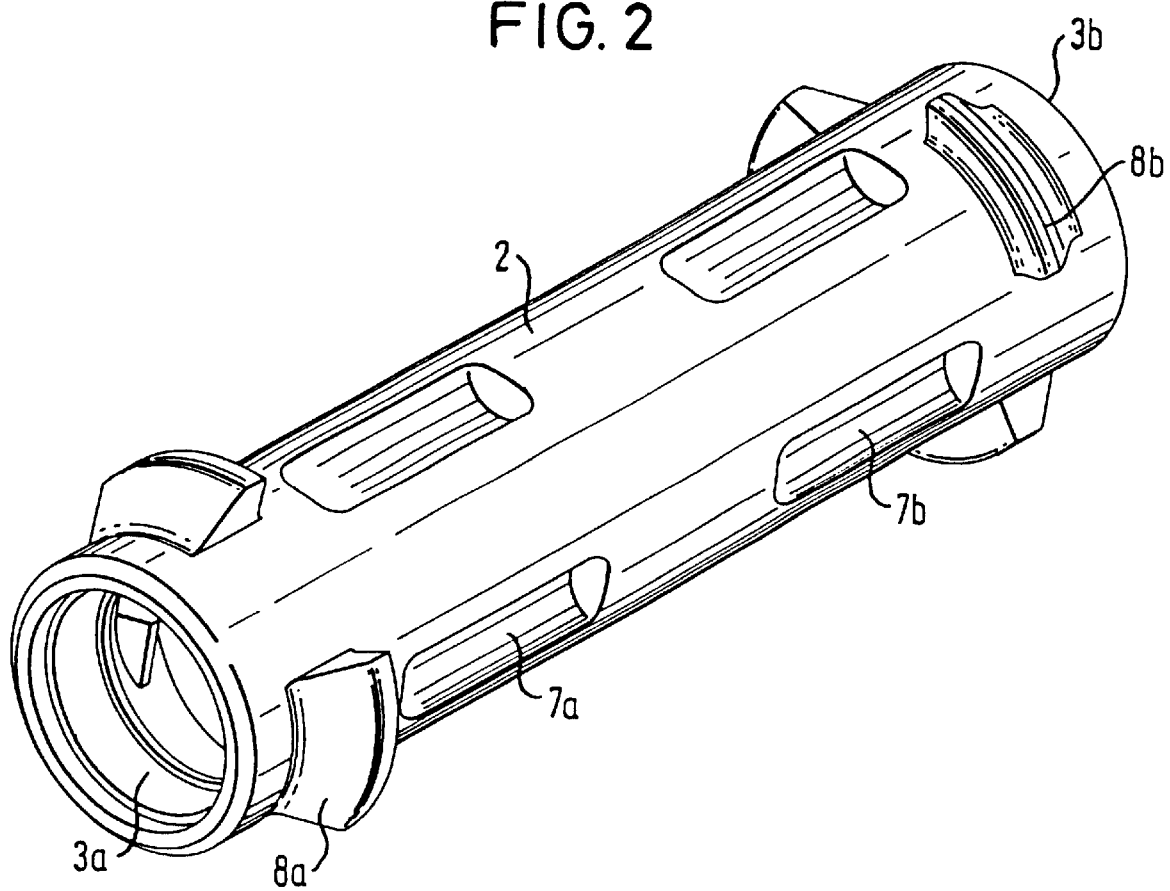
FIG. 2 shows a perspective view of the optical fibre coupling according to FIG. 1.

FIG. 2 shows the coupling housing 2 in a perspective view, the holder opening 3a, the crimp beads 7a, 7b, of which there is preferably a total of eight in the example shown, and the latching tabs 8a, 8b being clearly visible.

Figure 3A:
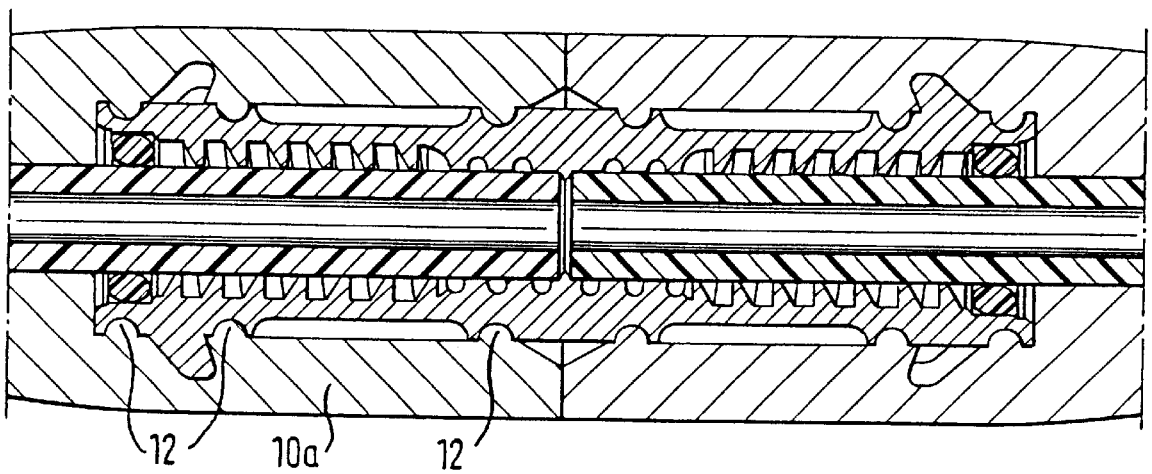
FIG. 3a shows a longitudinal section of the single-piece optical fibre coupling according to the invention with anti-kink sleeves slipped over both ends of the coupling.
Figure 3B:
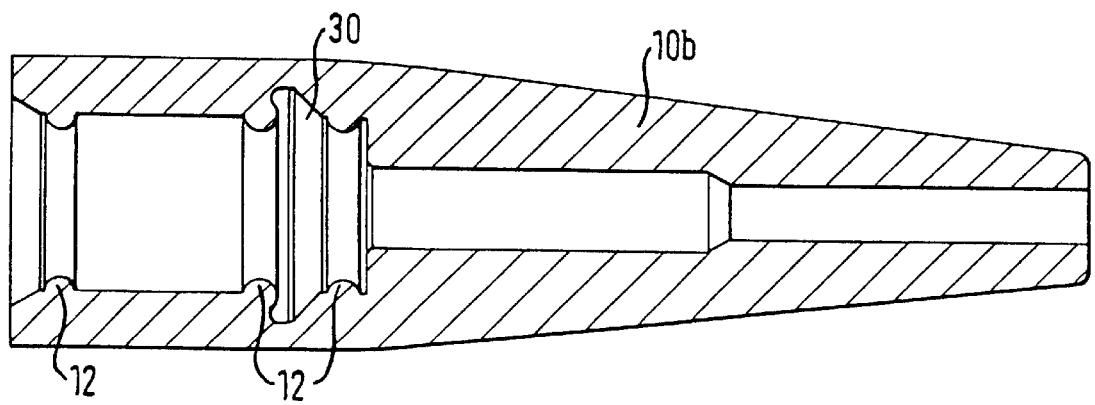
FIG. 3b shows a longitudinal section of an anti-kink sleeve according to the invention.

FIG. 3a essentially combines the views of FIG. 1 and FIG. 2, sealing lips 12 being arranged both in the vicinity of the ends 11a and 11b and also in front of and behind at least one recess 30 accommodating the latching tabs 8a and 8b on the inner wall of the anti-kink sleeve 10a and 10b, respectively, the said sealing lips 12 interacting with the outer surface of the coupling housing in order to seal off the coupling together with the anti-kink sleeves. An anti-kink sleeve without a coupling housing can be seen in longitudinal section in FIG. 3b.

Figure 4:
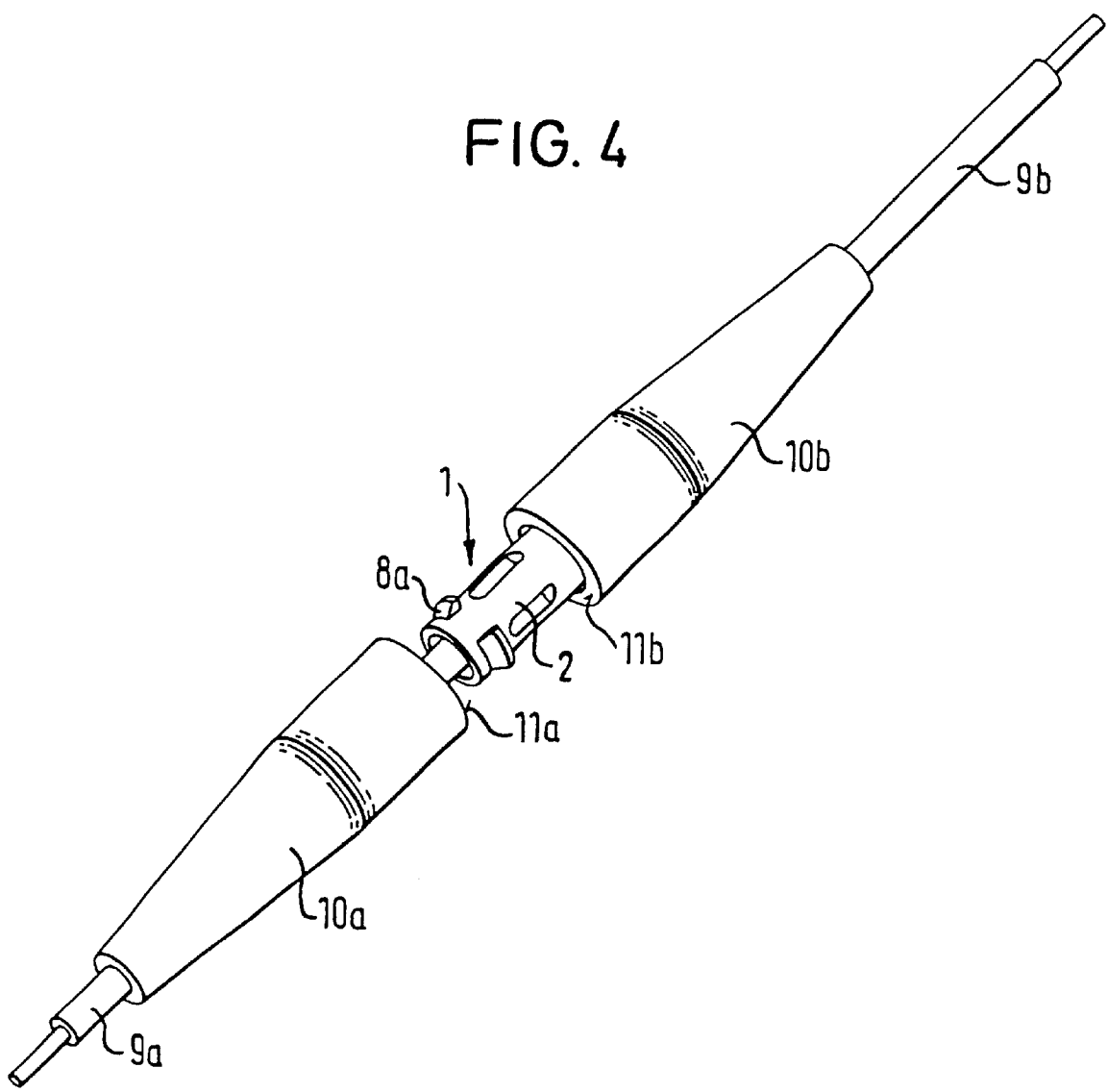
FIG. 4 shows a perspective view of the optical fibre coupling according to FIG. 1 with anti-kink sleeves.

Furthermore, the anti-kink sleeves are shown in a perspective view in FIG. 4. The anti-kink sleeve 10a has not yet been pushed onto the front half of the coupling housing, so that the latter is still exposed. It is possible to see the latching tabs 8a, which latch into corresponding grooves in the inner wall in the anti-kink sleeve 10a, the position of the said grooves on the anti-kink sleeve being indicated by a ring. On the cable side, the anti-kink sleeve tapers to the diameter of the fibre-optic cable, so that there is a force-fitting seal there. When the anti-kink sleeve 10a is pushed onto the housing 2, the ends of the two anti-kink sleeves 10a, 10b touch one another by way of their leading edges 11a, 11b, by which means the arrangement gains stability. The various sealing lips 12 and the sealing rings 13, and the fitting shape of the sleeve outlets at the cable sheath additionally ensure the sealing of the arrangement. The connection between fibre-optic cable ends which is produced in this way by the coupling according to the invention is simple to implement, saves space and seals off the coupling area effectively with respect to dust, water or gaseous media.

The above description of the exemplary embodiment shown in the figures is not to be understood as restrictive, but only as an illustration relating to the invention described in the claims.

What is claimed is:

1. A tubular single piece optical fiber coupling element comprising an outer section and inner section positioned on a first fiber receiving side having a first threaded section and on a second fiber receiving side having a second threaded section, said first and second threaded sections being directly in contact with and biting into said first and second fibers when said fibers are positioned in said optical coupling element.

2. A tubular single piece optical fiber coupling element according to claim 1 wherein said first and said second threaded sections are of a first diameter and are positioned remote from a middle position of said coupling element and further comprising third threaded sections of a second diameter, the third threaded sections being positioned proximate to the middle position of said optical coupling element.

3. A tubular single piece optical fiber coupling element according to claim 2 wherein said first diameter is larger than said second diameter.

4. A tubular single piece optical fiber coupling element according to claim 1, wherein said first and second threaded sections are round threads.

5. A tubular single piece optical fiber coupling element according to claim 1 wherein said coupling element further defines a housing having first and second fiber optic cable receiving openings at each of its end portions.

6. A tubular single piece optical fiber coupling element according to claim 5 wherein in a region in which said openings abut each other, said housing includes a peripheral stop for said first and second fiber optic cables.

7. A tubular single piece optical fiber coupling element according to claim 5, wherein said housing openings taper slightly conically inwards for the purpose of centering the cables.

8. A tubular single piece optical fiber coupling element according to claim 5, wherein there is an interspace between mutually opposite cable ends and the interspace is filled with an optical gel.

9. A tubular single, piece optical fiber coupling element according to claim 8, wherein the thread turns in the inner section open in the interspace between the fiber ends to accommodate excess optical gel.

10. A tubular single piece optical fiber coupling element according to claim 5, wherein in the region of said outer section, said housing includes at least two mutually opposite crimp beads which extend coaxially.

11. A tubular single piece optical fiber coupling element according to claim 5, wherein said housing is essentially cylindrical and includes at its ends, latching tabs for fastening anti-kink sleeves which have corresponding latching grooves and which can be plugged on from the ends in each case.

12. A tubular single piece optical fiber coupling element according to claim 11, wherein said anti-kink sleeves enclose a fiber sheath positioned tightly on the cable side and widen conically from there as far as a cylindrical part, at whose end said two anti-kink sleeves of a coupling respectively butt flush against each other.

13. A tubular single piece optical fiber coupling element according to claim 12, wherein on the inner walls of said anti-kink sleeves, in the vicinity of the ends thereof, optionally in front of and/or behind the recess which accommodates said latching tabs, sealing lips are provided to seal off said interspace between said housing and said anti-kink sleeves.

14. A tubular single piece optical fiber coupling element according to claim 5, wherein a sealing ring is provided in each case at the inlet to each housing opening in order to seal off the interspace between the fiber-optic cable and the inner walls of the housing opening.

* * * * *